United States Patent
Khlass et al.

(10) Patent No.: US 12,402,203 B2
(45) Date of Patent: Aug. 26, 2025

(54) CELL OFF INDICATION VIA DOWNLINK CONTROL INFORMATION

(71) Applicant: Nokia Technologies Oy, Espoo (FI)

(72) Inventors: Ahlem Khlass, Massy (FR); Naizheng Zheng, Beijing (CN); Matha Deghel, Massy (FR); Chunli Wu, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/930,531

(22) Filed: Oct. 29, 2024

(65) Prior Publication Data

US 2025/0151152 A1    May 8, 2025

(30) Foreign Application Priority Data

Nov. 2, 2023 (WO) ................ PCT/CN2023/129457

(51) Int. Cl.
*H04W 72/23* (2023.01)
*H04W 72/232* (2023.01)
*H04W 76/27* (2018.01)

(52) U.S. Cl.
CPC ......... *H04W 76/27* (2018.02); *H04W 72/232* (2023.01)

(58) Field of Classification Search
CPC ............................ H04W 76/27; H04W 72/232
See application file for complete search history.

(56) References Cited

U.S. PATENT DOCUMENTS

| | | | |
|---|---|---|---|
| 2016/0227602 A1 | 8/2016 | Yi et al. | |
| 2016/0255523 A1* | 9/2016 | Yi | H04W 52/0206 370/254 |
| 2017/0188304 A1 | 6/2017 | Lunttila et al. | |
| 2018/0302814 A1 | 10/2018 | Yi | |
| 2020/0296761 A1 | 9/2020 | Liu et al. | |

(Continued)

FOREIGN PATENT DOCUMENTS

| | | |
|---|---|---|
| CN | 116868629 A | 10/2023 |
| CN | 116939780 A | 10/2023 |

(Continued)

OTHER PUBLICATIONS

"New WID: Network energy savings for NR", 3GPP TSG RAN Meeting #98-e, RP-223540, Agenda: 9.1.1, Huawei, Dec. 12-16, 2022, pp. 1-6.

(Continued)

*Primary Examiner* — Andrew Lee
(74) *Attorney, Agent, or Firm* — ALSTON & BIRD LLP

(57) ABSTRACT

The present disclosure relates to a solution on cell off indication via DCI. In particular, a group common DCI format is used to indicate an activation/deactivation of the cell off for entering network energy saving mode. DCI in the group common DCI format may include separate bits for a first indication regarding the activation/deactivation of the cell off for entering network energy saving mode and a second indication regarding the activation/deactivation of cell DTX/DRX. Alternatively, the DCI may include common bits for the first and second indications with a flag to indicate which indication. In this way, the cell off for entering network energy saving mode can be indicated more efficiently.

20 Claims, 7 Drawing Sheets

(56) References Cited

U.S. PATENT DOCUMENTS

| | | | | |
|---|---|---|---|---|
| 2023/0300742 | A1* | 9/2023 | He | H04L 5/0098 |
| | | | | 370/311 |
| 2023/0389125 | A1* | 11/2023 | Islam | H04W 52/0229 |
| 2024/0023195 | A1* | 1/2024 | Kim | H04W 76/28 |
| 2024/0114460 | A1* | 4/2024 | Yi | H04W 52/0248 |
| 2024/0146459 | A1* | 5/2024 | Khan Beigi | H04W 72/232 |
| 2024/0224183 | A1* | 7/2024 | Zorgui | H04W 52/0232 |
| 2024/0267985 | A1* | 8/2024 | Moon | H04W 76/28 |
| 2024/0284550 | A1* | 8/2024 | Tseng | H04W 72/1273 |
| 2024/0334538 | A1* | 10/2024 | Zhou | H04W 52/0216 |

FOREIGN PATENT DOCUMENTS

| | | |
|---|---|---|
| WO | 2023/019399 A1 | 2/2023 |
| WO | 2023/170613 A1 | 9/2023 |
| WO | 2023/196223 A1 | 10/2023 |
| WO | 2025/012884 A1 | 1/2025 |

OTHER PUBLICATIONS

"3rd Generation Partnership Project; Technical Specification Group Radio Access Network; Study on network energy savings for NR (Release 18)", 3GPP TR 38.864, V18.1.0, Mar. 2023, pp. 1-72.

"LS on NES Cho", 3GPP TSG-RAN WG2 Meeting #123bis, R2-2311589, RAN2, Oct. 9-13, 2023, 1 page.

"Remaining issues of NES specific CHO enhancement", 3GPP TSG RAN WG2 Meeting #123b, R2-2310293, Agenda: 7.3.5, Apple, Oct. 9-13, 2023, pp. 1-11.

"3rd Generation Partnership Project; Technical Specification Group Radio Access Network; NR; Radio Resource Control (RRC) protocol specification (Release 17)", 3GPP TS 38.331, V17.6.0, Sep. 2023, pp. 1-1337.

"3rd Generation Partnership Project; Technical Specification Group Radio Access Network; NR; Physical layer procedures for control (Release 18)", 3GPP TS 38.213, V18.0.0, Sep. 2023, pp. 1-285.

"3rd Generation Partnership Project; Technical Specification Group Radio Access Network; NR; Multiplexing and channel coding (Release 18)", 3GPP TS 38.212, V18.0.0, Sep. 2023, pp. 1-278.

"Remaining issues for enhancements on cell DTX/DRX Mechanism", 3GPP TSG RAN WG1 Meeting #115, R1-2310986, Agenda: 8.5.2, Nokia, Nov. 13-17, 2023, 16 pages.

"IEEE 802.11", Wikipedia, Retrieved on Oct. 25, 2024, Webpage available at : https://en.wikipedia.org/wiki/IEEE 802.11.

International Search Report and Written Opinion received for corresponding Patent Cooperation Treaty Application No. PCT/CN2023/129457, dated Jun. 27, 2024, 8 pages.

"Connected Mode Mobility for NES", 3GPP TSG-RAN WG2 Meeting #122, R2-2306362, Agenda: 7.3.5, Nokia, May 22-26, 2023, 5 pages.

Intel Corporation, "Discussion summary #5 for enhancements on cell DTX/DRX mechanism", 3GPP TSG RAN WG1 #114bis, R1-2310454, (Oct. 9-13, 2023).

Office Action for Taiwanese Application No. 113141753 dated Apr. 10, 2025, 16 pages.

RAN2, "LS on NES CHO", 3GPP TSG RAN WG1 #115, R1-2311002, (Nov. 13-17, 2023), 1 page.

* cited by examiner

CELL OFF INDICATION VIA DOWNLINK CONTROL INFORMATION

FIELDS

Various example embodiments of the present disclosure generally relate to the field of telecommunication and in particular, to methods, devices, apparatuses and computer readable storage medium for cell off indication via downlink control information (DCI).

BACKGROUND

Network energy saving (NES) is a hot topic in communication field. For example, cell DTX/DRX is proposed at network device side in order to save power at the network device. Cell DTX/DRX configuration can be activated/deactivated by a group-common Downlink Control Information (DCI) message or via higher layer configurations. Furthermore, a cell off for entering NES mode with triggering of conditional handover (CHO) is also proposed to save power at the network side. Thus, how to activate or deactivate the cell off for entering NES mode with triggering of CHO needs to be studied.

SUMMARY

In a first aspect of the present disclosure, there is provided a first apparatus. The first apparatus comprises at least one processor; and at least one memory storing instructions that, when executed by the at least one processor, cause the first apparatus to: receive, from a second apparatus, first downlink control information in a predefined downlink control information format, wherein the first downlink control information comprises a first indication regarding whether a cell off for entering a network energy saving mode is activated; receive, from the second apparatus, second downlink control information in the predefined downlink control information format, wherein the second downlink control information comprises a second indication regarding whether a cell discontinuous operation is activated, the cell discontinuous operation comprises at least one of: a cell discontinuous transmission or a cell discontinuous reception, and wherein different bit fields in the predefined downlink control information format are used for the first indication and for the second indication, or wherein the same bit field is in the predefined downlink control information format is used for the first indication and for the second indication with a flag indicating whether the bit field comprises the first indication or the second indication.

In a second aspect of the present disclosure, there is provided a second apparatus. The second apparatus comprises at least one processor; and at least one memory storing instructions that, when executed by the at least one processor, cause the second apparatus to: transmit, to a first apparatus, first downlink control information in a predefined downlink control information format, wherein the first downlink control information comprises a first indication regarding whether a cell off for entering a network energy saving mode is activated; transmit, to the first apparatus, second downlink control information in the predefined downlink control information format, wherein the second downlink control information comprises a second indication regarding whether a cell discontinuous operation is activated, the cell discontinuous operation comprises at least one of: a cell discontinuous transmission or a cell discontinuous reception, and wherein different bit fields in the predefined downlink control information format are used for the first indication and for the second indication, or wherein the same bit field is in the predefined downlink control information format is used for the first indication and for the second indication with a flag indicating whether the bit field comprises the first indication or the second indication.

In a third aspect of the present disclosure, there is provided a method. The method comprises: receiving, from a second apparatus, first downlink control information in a predefined downlink control information format, wherein the first downlink control information comprises a first indication regarding whether a cell off for entering a network energy saving mode is activated; receiving, from the second apparatus, second downlink control information in the predefined downlink control information format, wherein the second downlink control information comprises a second indication regarding whether a cell discontinuous operation is activated, the cell discontinuous operation comprises at least one of: a cell discontinuous transmission or a cell discontinuous reception, and wherein different bit fields in the predefined downlink control information format are used for the first indication and for the second indication, or wherein the same bit field is in the predefined downlink control information format is used for the first indication and for the second indication with a flag indicating whether the bit field comprises the first indication or the second indication.

In a fourth aspect of the present disclosure, there is provided a method. The method comprises: transmitting, to a first apparatus, first downlink control information in a predefined downlink control information format, wherein the first downlink control information comprises a first indication regarding whether a cell off for entering a network energy saving mode is activated; transmitting, to the first apparatus, second downlink control information in the predefined downlink control information format, wherein the second downlink control information comprises a second indication regarding whether a cell discontinuous operation is activated, the cell discontinuous operation comprises at least one of: a cell discontinuous transmission or a cell discontinuous reception, and wherein different bit fields in the predefined downlink control information format are used for the first indication and for the second indication, or wherein the same bit field is in the predefined downlink control information format is used for the first indication and for the second indication with a flag indicating whether the bit field comprises the first indication or the second indication.

In a fifth aspect of the present disclosure, there is provided a first apparatus. The first apparatus comprises means for receiving, from a second apparatus, first downlink control information in a predefined downlink control information format, wherein the first downlink control information comprises a first indication regarding whether a cell off for entering a network energy saving mode is activated; means for receiving, from the second apparatus, second downlink control information in the predefined downlink control information format, wherein the second downlink control information comprises a second indication regarding whether a cell discontinuous operation is activated, the cell discontinuous operation comprises at least one of: a cell discontinuous transmission or a cell discontinuous reception, and wherein different bit fields in the predefined downlink control information format are used for the first indication and for the second indication, or wherein the same bit field is in the predefined downlink control information format is used for the first indication and for the second indication with a flag indicating whether the bit field comprises the first indication or the second indication.

In a sixth aspect of the present disclosure, there is provided a second apparatus. The second apparatus comprises means for transmitting, to a first apparatus, first downlink control information in a predefined downlink control information format, wherein the first downlink control information comprises a first indication regarding whether a cell off for entering a network energy saving mode is activated; means for transmitting, to the first apparatus, second downlink control information in the predefined downlink control information format, wherein the second downlink control information comprises a second indication regarding whether a cell discontinuous operation is activated, the cell discontinuous operation comprises at least one of: a cell discontinuous transmission or a cell discontinuous reception, and wherein different bit fields in the predefined downlink control information format are used for the first indication and for the second indication, or wherein the same bit field is in the predefined downlink control information format is used for the first indication and for the second indication with a flag indicating whether the bit field comprises the first indication or the second indication.

In a seventh aspect of the present disclosure, there is provided a computer readable medium. The computer readable medium comprises instructions stored thereon for causing an apparatus to perform at least the method according to the third aspect.

In an eighth aspect of the present disclosure, there is provided a computer readable medium. The computer readable medium comprises instructions stored thereon for causing an apparatus to perform at least the method according to the fourth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
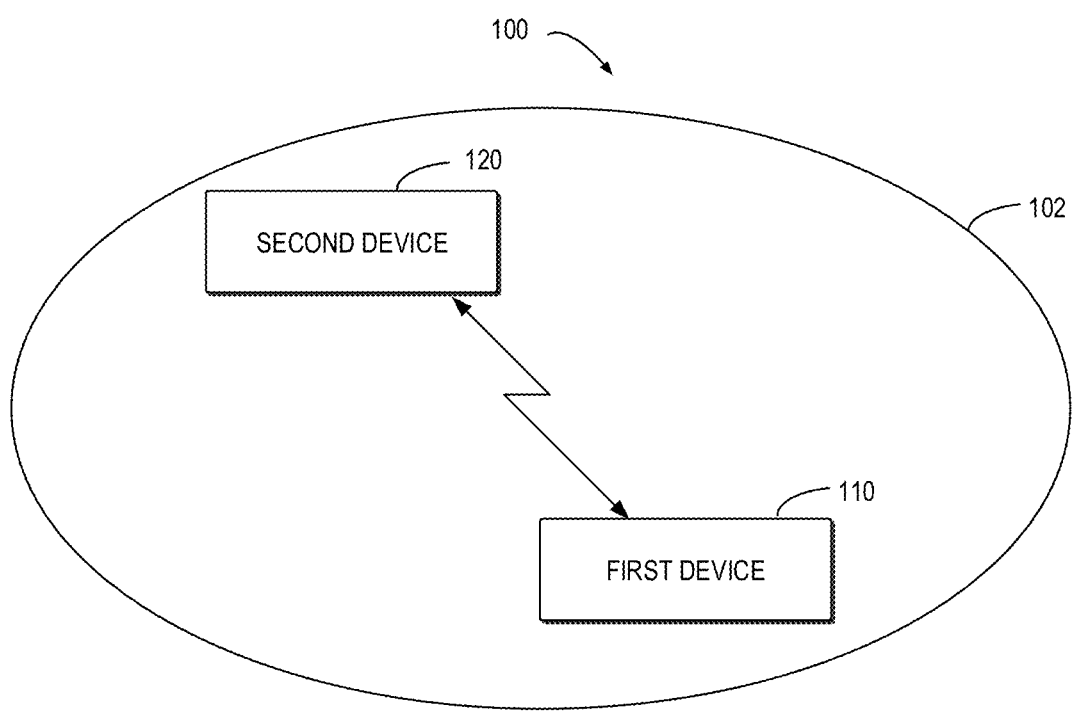
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second," . . . , etc. in front of noun(s) and the like may be used herein to describe various elements, these elements should not be limited by these terms. These terms are only used to distinguish one element from another and they do not limit the order of the noun(s). For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):
   (i) a combination of analog and/or digital hardware circuit(s) with software/firmware and
   (ii) any portions of hardware processor(s) with software (including digital signal processor(s)), software, and memory (ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G), the sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other combination of the time, frequency, space and/or code domain resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

As used herein, the term "cell discontinuous reception (DRX)" used herein may refer to a technique that allows a network device to receive data within a period and sleep within another period when there are no packets to be received. The term "cell discontinuous transmission (DTX)" used herein refers to a technique that allows the network device to transmit data within a period and sleep within another period when there are no packets to be transmitted. The cell DRX/DTX can be used in mobile communication to conserve the battery and/or save energy of the network device. The term "cell off" used herein may refer to a technique that allows the network device to switch off a cell for energy saving purpose. The term "downlink control information (DCI)" used herein may refer to information that provides to UE with necessary information, such as, physical layer resource allocation, power control command and the like. The term "DCI format" used herein may refer to a format indicate how DCI can be composed and can be used to distinguish DCI type.

The term "bit string" used herein may refer to a set of information bits in DCI format 2-X. The term "bit field" used herein may refer to the set of information bits in DCI format 2-X can be used for different features. For example, the bit field of first 30 information bits of the bit string are used for cell DTX/DRX (de-) activation feature, and the bit field of second 30 information bits of the bit string are used for NES cell off for CHO feature. The information bits are divided into several blocks/bit blocks, where each block comprises one or more bits that indicate cell DTX/DRX of a given serving cell. Accordingly, a bit field may comprise (de-) activation bits indicating cell DTX/DRX per serving cell/block. As mentioned above, cell DTX/DRX is proposed. In particular, a cell DTX/DRX configuration can be activated/deactivated by a group-common Downlink Control Information (DCI) message, so called DCI format 2_9 which includes at least N information (bit) block fields and where each information block field contains (de)-activation indication of a configuration of cell DTX and/or DRX of a serving cell. Moreover, the starting bit position for each information block is determined by a new parameter provided by higher layers for the UE.

In some solutions, a group common DCI format 2-X (for example, DCI format2-9) can be used for indicating the cell off that may then trigger conditional handover (CHO) NES event. The DCI format 2-9, originally designed for cell DTX/DRX (de)-activation indication can be re-used for this new purpose. For example, a 1-bit may be added for indicating of serving cell NES off for CHO in each bit block corresponding to each serving cell, since from network perspective, each serving cell/block can be seen either as primary cell (Pcell) for one UE, or as secondary cell (Scell) for other UEs. However, the added 1-bit for each serving cell for indicating of NES cell off can be a bit redundant if the given block/serving cell carrier is utilized only as Scell for all UEs in the cell, meaning that there is no need to have the NES cell off indication for Scell of UEs, and the cell off indication via Pcell is sufficient for UEs performing HO. Moreover, the cell off indication may not be combined or mixed with the indication of (de)-activation indication of cell DTX/DRX as both features do not need to be enabled at the same time, i.e., a cell intended to turn OFF would not indicate cell DTX/DRX (de)-activation.

The "cell off" state distinguishes from the DTX/DRX in that the particular cell is switched completely or substantially off, encompassing suspending both transmission and reception in the cell, while Cell DTX/DRX has active periods and non-active periods for transmission/reception based on the configured pattern. So if we consider a certain period of time, the cell is switched off for the whole duration in the cell off state while, in the DTX/DRX, the cell has alternating DTX/DRX active and non-active periods. Because the cell will be switched off in the cell off state, the UEs in the cell may be triggered to execute the CHO to the other cell(s). In the DTX/DRX, the UEs may stay in the cell so there is no need for the CHO.

According to example embodiments of the present disclosure, a solution on cell off indication for triggering CHO via DCI is proposed. In particular, a group common DCI format is used to indicate an activation/deactivation of the cell off for entering NES mode. DCI in the group common DCI format may include separate bits or utilizing different bit field for a first indication regarding the activation/deactivation of the cell off for entering NES mode and a second indication regarding the activation/deactivation of cell DTX/DRX. Alternatively, the DCI may include common bit fields for the first and second indications with a flag to indicate which indication to be applied. In this way, the cell off for entering NES mode can be indicated more efficiently.

FIG. 1 illustrates an example communication environment 100 in which example embodiments of the present disclosure can be implemented. In the communication environment 100, a first device 110 and a second device 120 may communicate with each other.

The first device 110 may be a terminal device, such as a UE. The second device 120 may be a network device, such as gNB. The first device 110 may be in a cell 102 which is one of the serving cells.

In the following, for the purpose of illustration, some example embodiments are described with the first device 110 operating as a terminal device and the second device 120 operating as a network device. However, in some example embodiments, operations described in connection with a terminal device may be implemented at a network device or other device, and operations described in connection with a network device may be implemented at a terminal device or other device.

In some example embodiments, if the first device 110 is a terminal device and the second device 120 is a network device, a link from the second device 120 to the first device 110 is referred to as a downlink (DL), and a link from the first device 110 to the second device 120 is referred to as an uplink (UL). In DL, the second device 120 is a transmitting (TX) device (or a transmitter) and the first device 110 is a receiving (RX) device (or a receiver). In UL, the first device 110 is a TX device (or a transmitter) and the second device 120 is a RX device (or a receiver).

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Example embodiments of the present disclosure will be described in detail below with reference to the accompanying drawings.

Figure 2:
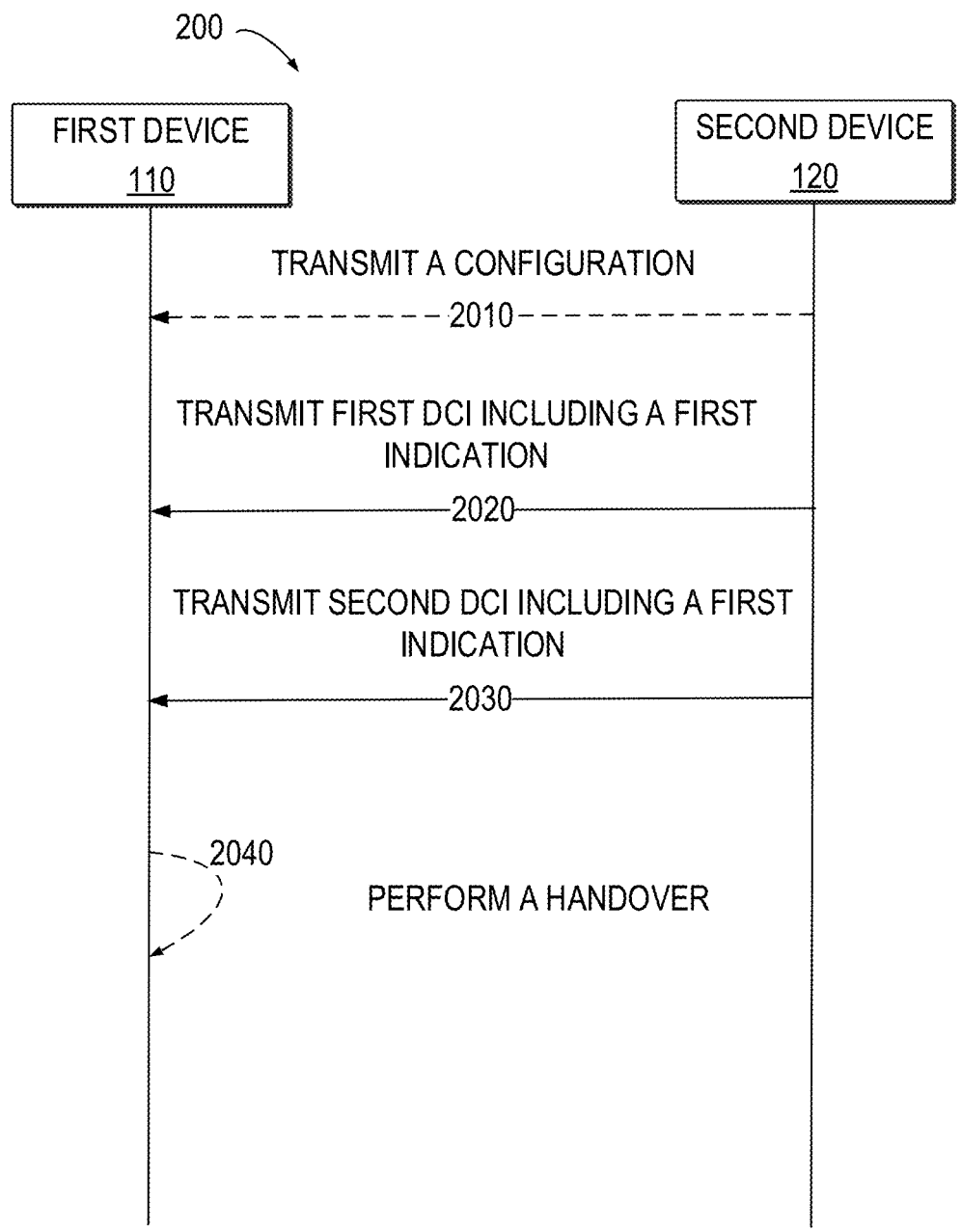
FIG. 2 illustrates a signaling chart for cell off for entering NES according to example embodiments of the present disclosure.

Reference is made to FIG. 2, which illustrates a signaling flow 200 in accordance with some embodiments of the present disclosure. For the purposes of discussion, the signaling flow 200 will be discussed with reference to FIG. 1, for example, by using the first device 110, the second device 120.

The second device 120 may transmit (2010) a configuration indicating a starting bit position for monitoring one or more indications in DCI to the first device 110. In other words, the first device 110 may receive (2010) the configuration from the second device 120. For example, the configuration may be transmitted via radio resource control (RRC) signaling.

In some example embodiments, the configuration may indicate the starting bit position for monitoring an indication (referred to as "second indication" hereinafter) regarding whether the cell discontinuous operation is activated. For example, as shown in FIG. 3A, 3B, 3C, 3E and 3G, the configuration may indicate one or more the starting bit positions 314-1, 314-2, . . . , and 314-N, where N is an integer number. The DCI format shown in FIG. 3A to FIG. 3G may be associated with N cells. By way of example, the starting position 314-1 may be used for UEs of which serving cell is cell #1, the starting position 314-2 may be used for UEs of which serving cell is cell #2, the starting position 314-3 may be used for UEs of which serving cell is cell #3, and the starting position 314-N may be used for UE of which serving cell is cell #N.

Alternatively, or in addition, the configuration may indicate the starting bit position for monitoring an indication (referred to as "first indication" hereinafter) regarding whether a cell off for entering NES mode is activated. For example, the starting bit position for monitoring the first indication may be different from the starting position for the second indication.

For example, as shown in FIG. 3A, 3B, 3D, 3F and 3H, the configuration may indicate one or more the starting bit positions 315-1, 315-2, . . . , and 315-M, where M is an integer number. By way of example, the starting position 315-1 may be used for UEs of which serving cell is cell #1, the starting position 315-2 may be used for UEs of which serving cell is cell #2, the starting position 315-3 may be used for UEs of which serving cell is cell #3, and the starting position 315-M may be used for UE of which serving cell is cell #M.

In some example embodiments, the first device 110 may be configured with a starting position(s), corresponding to the associated Pcell, for monitoring (i.e., reading) the first indication. Thus, such first devices may be configured with same or different starting positions. In some other example embodiments, if all first devices may be served by the same Pcell in the second device 120, only one bit may be needed for the first indication, and all first devices may be with the same starting position. Consequently, all first devices may perform the CHO altogether. In yet another example embodiment, a single bit may be used in the DCI in order to indicate the first indication and thus trigger CHO for any first device configured to monitor the DCI or indication including this single bit, regardless of whether the different devices have same PCell or not.

The second device 120 transmits (2020) first DCI including the first indication in a predetermined DCI format to the first device 110. In other words, the first device 110 receives (2020) the first DCI from the second device 110. The second device 120 transmits (2030) second DCI including the second indication in the predetermined DCI format to the first device 110. In other words, the first device 110 receives (2030) the second DCI from the second device 120. In some example embodiments, the first DCI and the second DCI may be a part of the same DCI transmitted by the second device 120 and received by the first device 110, which means that the first DCI and the second DCI may be transmitted in the same DCI message. That is, the transmission (2020) and the transmission (2030) may be regarded as one transmission. Alternatively, the first DCI and the second DCI may be provided in different pieces of DCI, e.g. the first DCI and the second DCI may be transmitted and received in different DCI messages and at different time intervals. There may be other transmissions or at least one pause between the different DCI messages.

In some example embodiments, different bit fields/bit positions in the predefined DCI format may be used for the first indication and for the second indication. For example, the padding bits in the predefined DCI format may be used for the first indication. Alternatively, the same bit field/bit position in the predefined DCI format may be used for the first indication and for the second indication with a flag indicating whether the bit field/bit position includes the first indication or the second indication. The bit position may be understood to refer to the location of the particular piece of DCI in the DCI format.

Figure 3A:
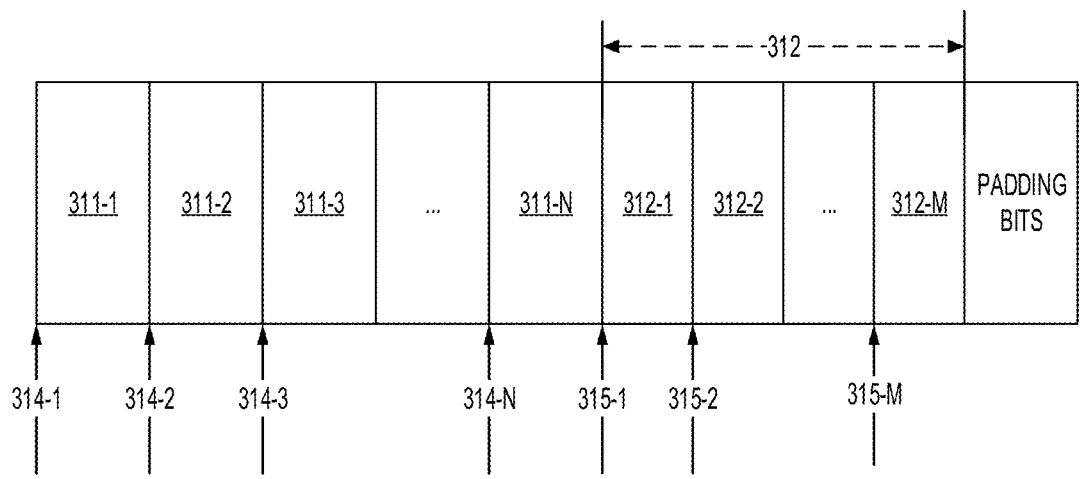
FIG. 3A to FIG. 3H illustrate schematic diagrams of downlink control information (DCI) formats according to example embodiments of the present disclosure, respectively.
Figure 3B:
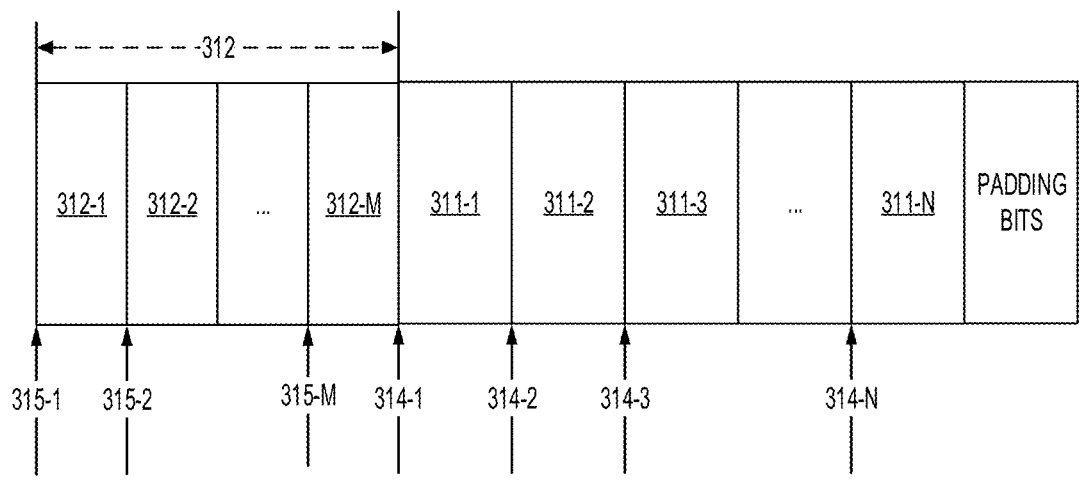

In an example embodiment, the first indication may be in a form of an information bit string of a single block. For example, as shown in FIG. 3A and FIG. 3B, the information bit string for the first indication includes information bits 312-1, 312-2, . . . , 312-M of the single block 312. In another example embodiments, the first indication may be in a form of an information bit string of a plurality of bit blocks. For example, as shown in FIG. 3A and FIG. 3B, each of information bits 312-1, 312-2, . . . , 312-M may be regarded as a block with fixed 1-bit.

In some example embodiments, the number of bits in the information bit string may be equal to a total number of serving cells of the second device 120. For example, the number of information bits 312-1, 312-2, . . . , 312-M may be equal to the total number of serving cells, i.e., M is equal to N.

Alternatively, the number of bits in the information bit string may be equal to a number of serving cells in a subset of serving cells. By way of example, the number of bits in the information bit string may be equal to the number of primary cells. For example, the number of information bits 312-1, 312-2, . . . , 312-M may be equal to the number of serving cells in the subset of serving cells including M serving cells, i.e., M is smaller than N. For example, the subset of serving cells may be configured by the second device 120. By way of example, a higher layer configuration (such as, RRC configuration) may be transmitted by the second device 120 indicating which serving cell(s) presented with the 1-bit for cell off indication for NES mode. Only as an example, the subset of serving cells may include cell #1, cell #2, . . . , and cell #M.

Each bit in the information bit string may correspond to a serving cell of the second device 120. For example, each bit in the information bit string may be used to notify the cell off status for NES of a given serving cell in the second device 120. By way of example, the bit 312-1 may correspond to cell #1, the bit 312-2 may correspond to cell #2, and the bit 312-M may correspond to cell #M.

In some example embodiments, the information bit string may be placed or located after the second indication in the predefined DCI format. For example, as shown in FIG. 3A, the predefined DCI may include a bit block 311-1 that includes 2 bits for an activation/deactivation indication of cell DTX and DRX of cell #1, a bit block 311-2 that includes 1 bit for an activation/deactivation indication of cell DTX or DRX of cell #2, a bit block 311-3 that includes 2 bits for an activation/deactivation indication of cell DTX and DRX of cell #3, . . . , and a bit block 311-N that includes 2 bits for an activation/deactivation indication of cell DTX and DRX of cell #N. As shown in FIG. 3A, the information bit string including bits 312-1, 312-2, . . . , 312-M is placed after the bit block 311-N.

Alternatively, the information bit string may be located before the second indication in the predefined DCI format. For example, as shown in FIG. 3B, the predefined DCI may include a bit block 311-1 that includes 2 bits for an activation/deactivation indication of cell DTX and DRX of cell #1, a bit block 311-2 that includes 1 bit for an activation/deactivation indication of cell DTX or DRX of cell #2, a bit block 311-3 that includes 2 bits for an activation/deactivation indication of cell DTX and DRX of cell #3, . . . , and a bit block 311-N that includes 2 bits for an activation/deactivation indication of cell DTX and DRX of cell #N. As shown in FIG. 3B, the information bit string including bits 312-1, 312-2, . . . , 312-M is placed before the bit block 311-1. In such case, the starting bit position for the first indication can be assumed (or as default) to start from the start/beginning (e.g., 1st bit position) of the information bit string for all UEs. In this way, the number of bits for indicating the starting position can be reduced.

In some example embodiments, if the first indication indicates the cell off for the entering network energy saving mode is activated for a target serving cell, the first device 110 mat skip information carried in the second indication for the target serving cell. For example, as shown in FIG. 3B, if the serving cell of the first device 110 is cell #2 and the bit 312-2 indicates the cell off for entering network energy saving mode is activated for cell #2, the first device 110 may skip the information carried in the bit block 311-2 for cell #2.

As mentioned above, the same bit field in the predefined DCI format may be used for the first indication and for the second indication with a flag indicating whether the bit field includes the first indication or the second indication. In other words, the bit field may be re-interpreted for the first indication. In this case, the first indication may not be combined or mixed with the second indication in the same string.

Figure 3C:
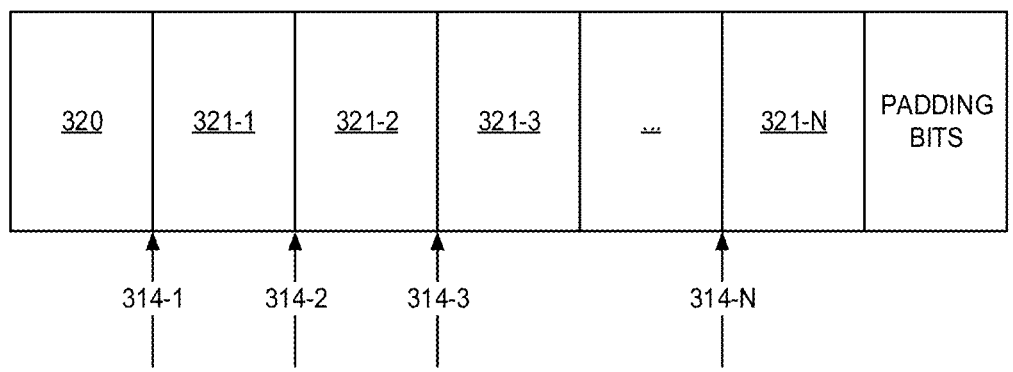
Figure 3D:
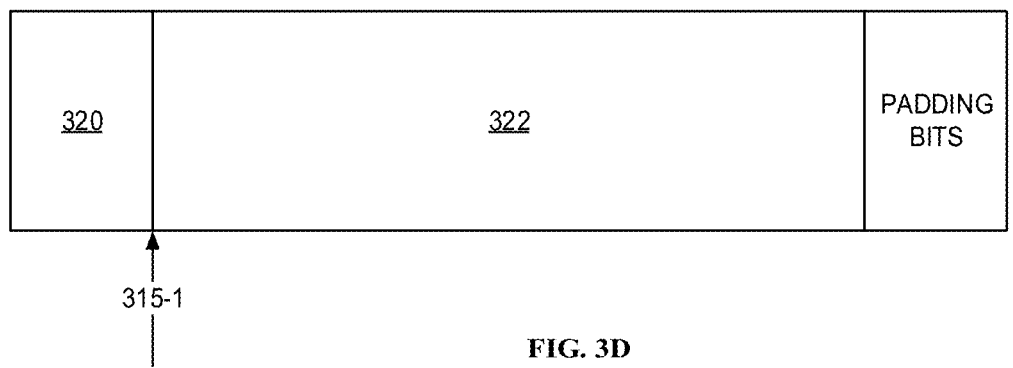

In some example embodiments, the flag per information bit string in the predefined DCI format may indicate whether the bit field includes the first indication or the second for all serving cells. For example, the flag in the information bit string (e.g., 1st bit of the information bit string) may inform all first devices which one of the two NES features (for example, cell DTX/DRX or cell off for entering NES mode) needs to be considered for the indicated information in the information bit string. For example, as shown in FIG. 3C and FIG. 3D, the flag bit 320 may be used to indicate whether the bit position includes the first indication or the second. It is noted that the flag may not be limited to the indication of Cell DTX/DRX and cell off for entering the NES mode, and may further used for other NES features in the future.

In some example embodiments, a flag-bit with value with a first predefined value may represent the information bit string is used for (de-) activation of cell DTX/DRX purpose (i.e., the second indication), where multi-block structure is applied/considered by the first device 110. For example, as shown in FIG. 3C, if the flag bit 320 indicates a first predefined value (for example, "0"), it means that the information bit string including the bit blocks 321-1, 321-2, 321-2, . . . , and 321-N is used for the second indication. Only as an example, the bit block 321-1 may include 2 bits for an activation/deactivation indication of cell DTX and DRX of cell #1, a bit block 321-2 may include includes 1 bit for an activation/deactivation indication of cell DTX or DRX of cell #2, the bit block 321-3 may include 2 bits for an activation/deactivation indication of cell DTX and DRX of cell #3, . . . , and the bit block 321-N may include 2 bits for an activation/deactivation indication of cell DTX and DRX of cell #N.

In some example other embodiments, a flag-bit with a second predefined value may represent the information bit string is used for the cell off for CHO (i.e., the first indication), where a single block structure is applied/considered by first devices. For example, as shown in FIG. 3D, if the flag bit 320 indicates a second predefined value (for example, "1"), it means that the information bit string 322 is used for the first indication. In this case, in some example embodiments, each bit in the information bit string 322 may correspond to a serving cell.

Alternatively, the multi-block structure can be also applied for the first indication for CHO, where each bit in the information bit string 322 is used to notify the cell off status of a given serving cell in the second device 120. In this case, the length of the information bit string 322 (the number of bits in the information bit string) may be equal to the total number of serving cells of the second device 120. Alternatively, the length of the information bit string 322 may be equal to a number corresponding to a subset of serving cells.

In some example embodiments, a single starting bit position may be configured via higher-layer configuration for monitoring the first indication for the second indication. For example, as shown in FIG. 3D, the starting bit position 315-1 may be configured by the second device 120 for monitoring the first indication.

Figure 3E:
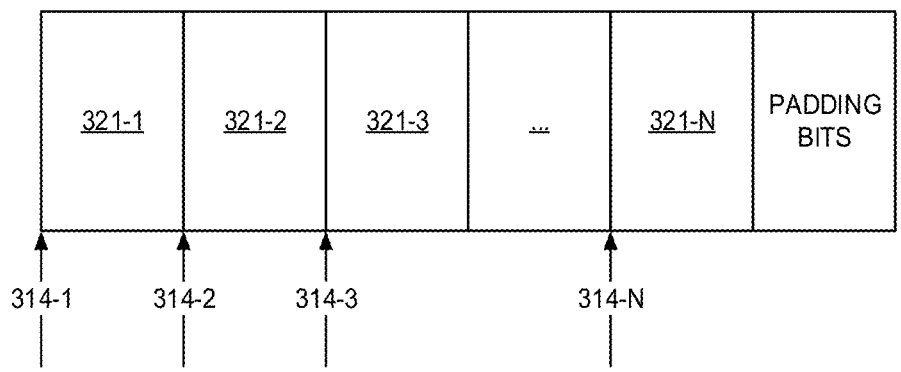
Figure 3F:
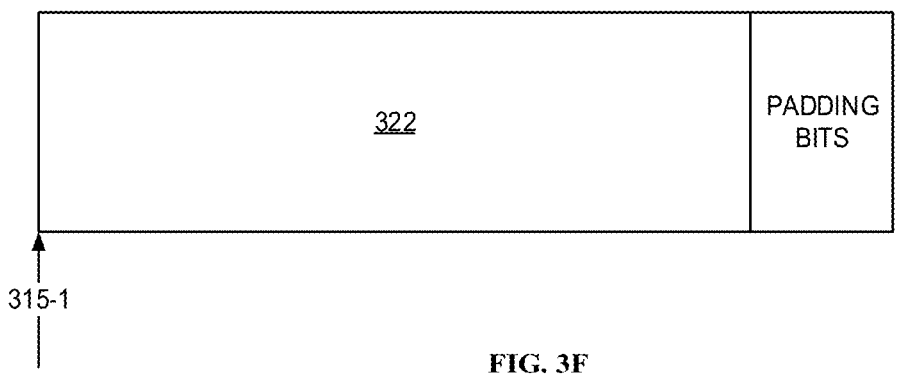

The flag may be present if both the cell off for entering network energy saving mode and the cell discontinuous operation are enabled or configured via higher layer parameters than the DCI. In other words, a flag bit may only be present if both cell DTX/DRX and the cell off for entering NES mode are enabled. Otherwise, if only one of the NES features is enabled, the information bit string is only used for the enabled NES feature. For example, as shown in FIG. 3E, if only cell DTX/DRX is enabled, the information bit string including the bit blocks 321-1, 321-2, 321-2, . . . , and 321-N is used for the second indication. Alternatively, as shown in FIG. 3F, if only the cell off for entering NES mode is enabled, the information bit string 322 is used for the first indication.

In some example embodiments, the block information bits may be re-interpreted per serving cell level, specifically for the first indication. The first indication may not be combined or mixed with the second indication in the same block information.

In some example embodiments, the flag per information bit string indicates whether the bit field comprises the first indication or the second indication per serving cell or per block in the predefined DCI format. For example, the flag in each block information of the information bit string (e.g., flag-bit is the 1st bit of each block information) may inform the first device 110 which one of the two NES features (i.e., cell DTX/DRX or cell off) needs to be considered for the indicated information in the following bits. By way of example, if the flag bit 320 indicates a first predefined value (for example, "0"), it means that the following bits are for the second indication, and if the flag bit 320 indicates a second predefined value (for example, "1"), it means that the following bits are for the first indication.

Figure 3G:
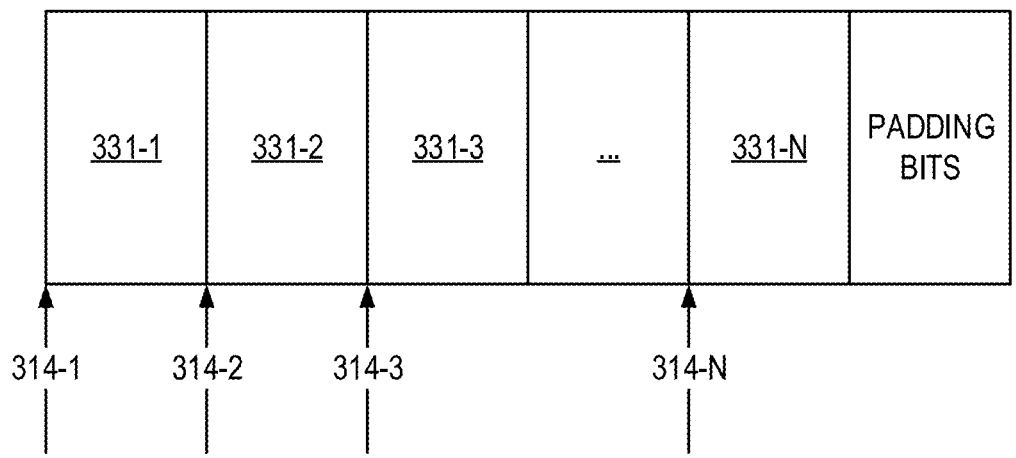

For example, as shown in FIG. 3G, a bit block 331-1 may include the flag and the first or second indication for cell #1, a bit block 331-2 may include the flag and the first or second indication for cell #2, a bit block 331-3 may include the flag and the first or second indication for cell #3, . . . , and a bit block 331-N may include the flag and the first or second indication for cell #N. By way of example, if the block 331-1 indicates "0 11", it indicates the activation of the cell DTX and cell DRX for cell #1. Alternatively, if the bit block 331-1 indicates "1 1", it indicates the activation of cell off for entering NES mode for cell #1.

Figure 3H:
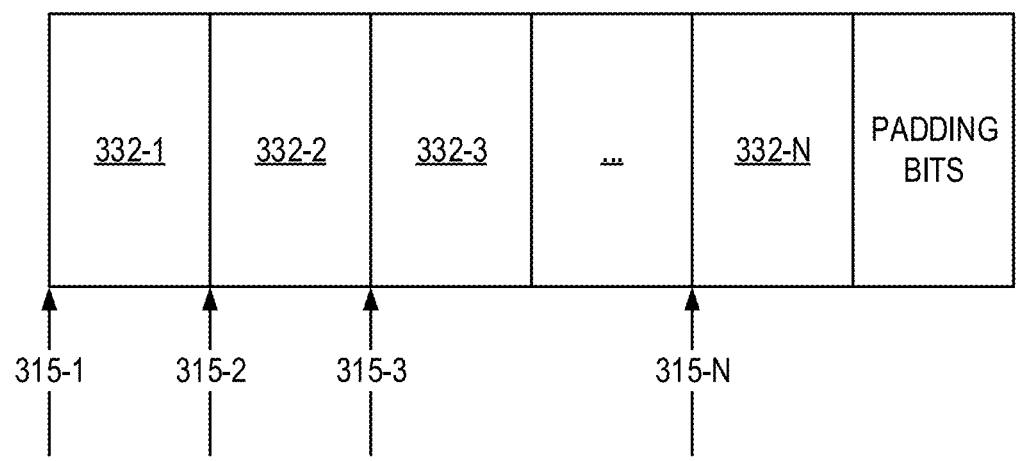

In some example embodiments, the DCI may include the first indication and the second indication per serving cell or per block in the predefined DCI format. In some other example embodiments, the DCI may include the first indication and the second indication per Pcell. In this case, which cell(s) or which Pcell(s) configured with the first indication may be configured/indicated by the second apparatus 120. For example, one bit indication for the cell off for entering NES mode per block/serving cell may be added, in addition to cell DTX/DRX (de)-activation indication. In other words, the first device 110 may be configured, for a serving cell, with a block containing cell-off indication for CHO in addition to cell DTX/DRX (de)-activation indication. For example, as shown in FIG. 3H, a bit block 332-1 may include the first and the second indications for cell #1, a bit block 332-2 may include the first and the second indications for cell #2, a bit block 332-3 may include the first and the second indications for cell #3, . . . , and a bit block 332-N may include the first and the second indications for cell #N. Alternatively, if the second apparatus 120 indicates cell #2 and cell #3 are Pcells and other cells are Scells, the bit block 332-2 may include the first and the second indications for cell #2, the bit block 332-3 may include the first and the second indications for cell #3, and other bit blocks (for example, 332-1) may include the second indication for their related cells.

The first device 110 may perform (2040) a CHO based on the first indication. For example, after receiving the first indication that indicates the cell off for entering the NES mode is enabled, a corresponding conditional handover may be triggered accordingly. In this case, a threshold for CHO can be lower than a legacy HO for assisting handover to other cells in case of NES serving cell off happening.

According to example embodiments described with reference to FIG. 2, it proposes efficient handling of cell off indication for CHO event by reusing the DCI format 2_9 originally designed for Cell DTX/DRX (de)-activation indication.

Figure 4:
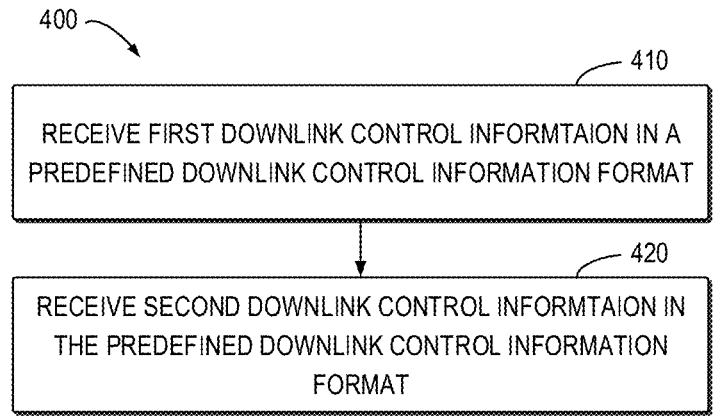
FIG. 4 illustrates a flowchart of a method implemented at a first device according to some example embodiments of the present disclosure.

FIG. 4 shows a flowchart of an example method 400 implemented at a first apparatus in accordance with some example embodiments of the present disclosure. For example, the first apparatus may be the first device 110 in FIG. 1.

At block 410, the first apparatus receives, from a second apparatus, first downlink control information in a predefined downlink control information format. The first downlink control information comprises a first indication regarding whether a cell off for entering a network energy saving mode is activated.

At block 420, the first apparatus receives, from the second apparatus, second downlink control information in the predefined downlink control information format. The second downlink control information comprises a second indication regarding whether a cell discontinuous operation is activated, the cell discontinuous operation comprises at least one of: a cell discontinuous transmission or a cell discontinuous reception. Different bit fields in the predefined downlink control information format are used for the first indication and for the second indication. Alternatively, the same bit filed is in the predefined downlink control information format is used for the first indication and for the second indication with a flag indicating whether the bit filed comprises the first indication or the second indication.

In some example embodiments, the first downlink control information and the second downlink control information are comprised in the same downlink control information message.

In some example embodiments, the first indication is in a form of an information bit string of a single block, or wherein the first indication is in a form of an information bit string of a plurality of blocks.

In some example embodiments, the number of bits in the information bit string is equal to a total number of serving cells of the second apparatus, or wherein the number of bits in the information bit string is equal to a number of serving cells in a subset of serving cells with higher layer configuration by the second apparatus.

In some example embodiments, each information bit in the information bit string corresponds to a serving cell of the second apparatus.

In some example embodiments, the information bit string is located after the second indication in the predefined downlink control information format, or wherein the information bit string is located before the second indication in the predefined downlink control information format.

In some example embodiments, the method 400 further comprises: based on a determination that the first indication indicates the cell off for entering the network energy saving mode is activated for a serving cell, skipping information carried in the second indication for the serving cell.

In some example embodiments, the same downlink control information message comprises the first indication and the second indication per serving cell or per block in the predefined downlink control information format, or the same downlink control information message comprises the first indication per primary cell with higher layer configured by the second apparatus.

In some example embodiments, the first downlink control information and the second downlink control information are received in different downlink control information messages.

In some example embodiments, bit fields of the first indication in the first downlink control information are different from bit fields of the second indication in the second downlink control information.

In some example embodiments, bit fields of the first indication in the first downlink control information are same as bit fields of the second indication in the second downlink control information, and at least one information bit in bit field comprises the flag indicating that the bit field comprise the first indication or second indication.

In some example embodiments, the flag per bit field in the predefined downlink control information format indicates whether the bit field comprises the first indication or the second indication in the second apparatus, or the flag per serving cell or per bit block in the predefined downlink control information format indicates whether the information bit field comprises the first indication or the second indication per serving cell or per bit block in the predefined downlink control information format.

In some example embodiments, the flag is present if both the cell off for entering network energy saving mode and the cell discontinuous operation are enabled or configured via higher layer parameters which are higher than physical layer.

In some example embodiments, the method 400 further comprises: receiving, from the second apparatus, at least one higher layer configuration indicating at least one starting bit position for monitoring the first indication.

In some example embodiments, the first apparatus comprises a terminal device, and the second apparatus comprises a network device.

Figure 5:
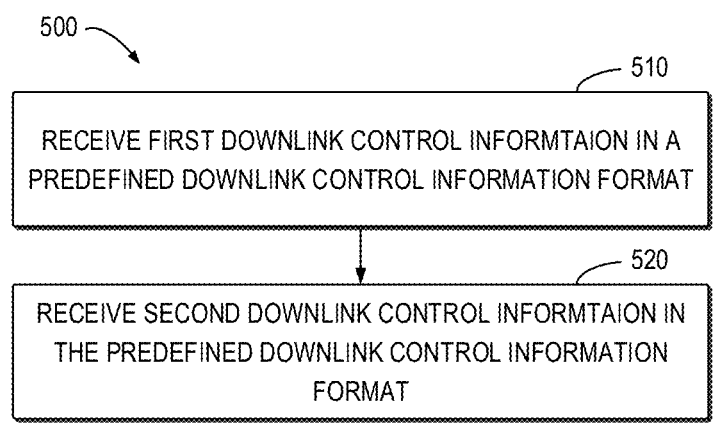
FIG. 5 illustrates a flowchart of a method implemented at a second device according to some example embodiments of the present disclosure.

FIG. 5 shows a flowchart of an example method 500 implemented at a second apparatus in accordance with some example embodiments of the present disclosure. For example, the second apparatus may be the second device 120 in FIG. 1.

At block 510, the second apparatus transmits, to a first apparatus, first downlink control information in a predefined downlink control information format. The first downlink control information comprises a first indication regarding whether a cell off for entering a network energy saving mode is activated.

At block 520, the second apparatus transmits, to the first apparatus, second downlink control information in the predefined downlink control information format. The second downlink control information comprises a second indication regarding whether a cell discontinuous operation is activated. The cell discontinuous operation comprises at least one of: a cell discontinuous transmission or a cell discontinuous reception. Different bit fields in the predefined downlink control information format are used for the first indication and for the second indication. Alternatively, the same bit field is in the predefined downlink control information format is used for the first indication and for the second indication with a further flag indicating whether the bit field comprises the first indication or the second indication.

In some example embodiments, the first downlink control information and the second downlink control information are comprised in the same downlink control information message.

In some example embodiments, the first indication is in a form of an information bit string of a single block, or wherein the first indication is in a form of an information bit string of a plurality of blocks.

In some example embodiments, the number of bits in the information bit string is equal to a total number of serving cells of the second apparatus, or wherein the number of bits in the information bit string is equal to a number of serving cells in a subset of serving cells of with higher layer configuration by second apparatus.

In some example embodiments, each information bit in the information bit string corresponds to a serving cell of the second apparatus.

In some example embodiments, the information bit string is located after the second indication in the predefined downlink control information format, or wherein the information bit string is located before the second indication in the predefined downlink control information format.

In some example embodiments, the same downlink control information message comprises the first indication and the second indication per serving cell or per block in the predefined downlink control information format, or the same downlink control information message comprises the first indication per primary cell with higher layer configured by the second apparatus.

In some example embodiments, the first downlink control information and the second downlink control information are received in different downlink control information messages.

In some example embodiments, bit fields of the first indication in the first downlink control information are different from bit fields of the second indication in the second downlink control information.

In some example embodiments, bit fields of the first indication in the first downlink control information are same as bit fields of the second indication in the second downlink control information, and wherein at least one information bit in bit field comprises the flag indicating that the bit field comprise the first indication or second indication.

In some example embodiments, the flag per bit field in the predefined downlink control information format indicates whether the bit field comprises the first indication or the second indication for the second apparatus, or wherein the flag per serving cell or per bit block in the predefined downlink control information format indicates whether the bit field comprises the first indication or the second indication per serving cell or per bit block in the predefined downlink control information format.

In some example embodiments, the flag bit is present if both the cell off for entering network energy saving mode and the cell discontinuous operation are enabled or configured via higher layer parameters which are higher than physical layer.

In some example embodiments, the method 500 further comprises: transmitting, to the first apparatus, at least one configuration indicating at least one starting bit position for monitoring the first indication.

In some example embodiments, the first apparatus comprises a terminal device, and the second apparatus comprises a network device.

In some example embodiments, a first apparatus capable of performing any of the method 400 (for example, the first device 110 in FIG. 1) may comprise means for performing the respective operations of the method 400. The means may be implemented in any suitable form. For example, the means may be implemented in a circuitry or software module. The first apparatus may be implemented as or included in the first device 110 in FIG. 1.

In some example embodiments, the first apparatus comprises means for receiving, from a second apparatus, first downlink control information in a predefined downlink control information format, wherein the first downlink control information comprises a first indication regarding whether a cell off for entering a network energy saving mode is activated; means for receiving, from the second apparatus, second downlink control information in the predefined downlink control information format, wherein the second downlink control information comprises a second indication regarding whether a cell discontinuous operation is activated, the cell discontinuous operation comprises at least one of: a cell discontinuous transmission or a cell discontinuous reception, and wherein different bit field in the predefined downlink control information format are used for the first indication and for the second indication, or wherein the same bit field in the predefined downlink control information format is used for the first indication and for the second indication with a flag indicating whether the bit field comprises the first indication or the second indication.

In some example embodiments, the first downlink control information and the second downlink control information are comprised in the same downlink control information message.

In some example embodiments, the first indication is in a form of an information bit string of a single block, or wherein the first indication is in a form of an information bit string of a plurality of blocks.

In some example embodiments, the number of bits in the information bit string is equal to a total number of serving cells of the second apparatus, or wherein the number of bits in the information bit string is equal to a number of serving cells in a subset of serving cells with higher layer configuration by the second apparatus.

In some example embodiments, each information bit in the information bit string corresponds to a serving cell of the second apparatus.

In some example embodiments, the information bit string is located after the second indication in the predefined downlink control information format, or wherein the information bit string is located before the second indication in the predefined downlink control information format.

In some example embodiments, the first apparatus further comprises: means for based on a determination that the first indication indicates the cell off for entering the network energy saving mode is activated for a serving cell, skipping information carried in the second indication for the serving cell.

In some example embodiments, the same downlink control information message comprises the first indication and the second indication per serving cell or per block in the predefined downlink control information format, or wherein the same downlink control information message comprises the first indication per primary cell with higher layer configured by the second apparatus.

In some example embodiments, the first downlink control information and the second downlink control information are received in different downlink control information messages.

In some example embodiments, bit fields of the first indication in the first downlink control information are different from bit fields of the second indication in the second downlink control information.

In some example embodiments, bit fields of the first indication in the first downlink control information are same as bit fields of the second indication in the second downlink control information, and wherein at least one information bit in bit field comprises the flag indicating that the bit field comprise the first indication or second indication.

In some example embodiments, the flag per bit field in the predefined downlink control information format indicates whether the bit field comprises the first indication or the second indication in the second apparatus, or wherein the flag per serving cell or per bit block in the predefined downlink control information format indicates whether the bit field comprises the first indication or the second indication per serving cell or per bit block in the predefined downlink control information format.

In some example embodiments, the flag is present if both the cell off for entering network energy saving mode and the cell discontinuous operation are enabled or configured via higher layer parameters which are higher than physical layer.

In some example embodiments, the first apparatus further comprises: means for receiving, from the second apparatus, at least one higher layer configuration indicating at least one starting bit position for monitoring the first indication.

In some example embodiments, the first apparatus comprises a terminal device, and the second apparatus comprises a network device.

In some example embodiments, the first apparatus further comprises means for performing other operations in some example embodiments of the method 400 or the first device 110. In some example embodiments, the means comprises at least one processor; and at least one memory storing instructions that, when executed by the at least one processor, cause the performance of the first apparatus.

In some example embodiments, a second apparatus capable of performing any of the method 500 (for example, the second device 120 in FIG. 1) may comprise means for performing the respective operations of the method 500. The means may be implemented in any suitable form. For example, the means may be implemented in a circuitry or software module. The second apparatus may be implemented as or included in the second device 120 in FIG. 1.

In some example embodiments, the second apparatus comprises means for transmitting, to a first apparatus, first downlink control information in a predefined downlink control information format, wherein the first downlink control information comprises a first indication regarding whether a cell off for entering a network energy saving mode is activated; means for transmitting, to the first apparatus, second downlink control information in the predefined downlink control information format, wherein the second downlink control information comprises a second indication regarding whether a cell discontinuous operation is activated, the cell discontinuous operation comprises at least one of: a cell discontinuous transmission or a cell discontinuous reception, and wherein different bit fields in the predefined downlink control information format are used for the first indication and for the second indication, or wherein the same bit field is in the predefined downlink control information format is used for the first indication and for the second indication with a flag indicating whether the bit field comprises the first indication or the second indication.

In some example embodiments, the first downlink control information and the second downlink control information are comprised in the same downlink control information message.

In some example embodiments, the first indication is in a form of an information bit string of a single block, or wherein the first indication is in a form of an information bit string of a plurality of blocks.

In some example embodiments, the number of bits in the information bit string is equal to a total number of serving cells of the second apparatus, or wherein the number of bits in the information bit string is equal to a number of serving cells in a subset of serving cells of with higher layer configuration by the second apparatus.

In some example embodiments, each information bit in the information bit string corresponds to a serving cell of the second apparatus.

In some example embodiments, the information bit string is located after the second indication in the predefined downlink control information format, or wherein the information bit string is located before the second indication in the predefined downlink control information format.

In some example embodiments, the downlink control information comprises the first indication and the second indication per serving cell or per block in the predefined downlink control information format, or wherein the same downlink control information message comprises the first indication per primary cell with higher layer configured by the second apparatus.

In some example embodiments, the second apparatus is configured to: means for transmitting the first downlink control information and the second downlink control information in different downlink control information messages.

In some example embodiments, bit fields of the first indication in the first downlink control information are different from bit fields of the second indication in the second downlink control information.

In some example embodiments, bit fields of the first indication in the first downlink control information are same as bit fields of the second indication in the second downlink control information, and wherein at least one information bit in bit field comprises the flag indicating that the bit field comprises the first indication or the second indication.

In some example embodiments, the flag per bit field in the predefined downlink control information format indicates whether the bit field comprises the first indication or the second indication in the second apparatus, or wherein the flag per serving cell or per bit block in the predefined downlink control information format indicates whether the bit field comprises the first indication or the second indication per serving cell or per bit block in the predefined downlink control information format.

In some example embodiments, the flag bit is present if both the cell off for entering network energy saving mode and the cell discontinuous operation are enabled or configured via higher layer parameters which are higher than physical layer.

In some example embodiments, the second apparatus is caused means for transmitting, to the first apparatus, at least one higher layer configuration indicating at least one starting bit position for monitoring the first indication.

In some example embodiments, the first apparatus comprises a terminal device, and the second apparatus comprises a network device.

In some example embodiments, the second apparatus further comprises means for performing other operations in some example embodiments of the method 500 or the second device 120. In some example embodiments, the means comprises at least one processor; and at least one memory storing instructions that, when executed by the at least one processor, cause the performance of the second apparatus.

Figure 6:
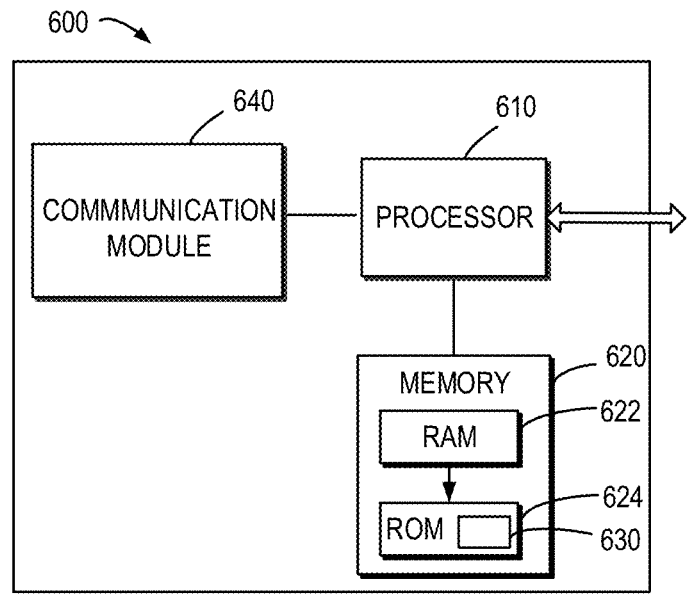
FIG. 6 illustrates a simplified block diagram of a device that is suitable for implementing example embodiments of the present disclosure.

FIG. 6 is a simplified block diagram of a device 600 that is suitable for implementing example embodiments of the present disclosure. The device 600 may be provided to implement a communication device, for example, the first device 110 or the second device 120 as shown in FIG. 1. As shown, the device 600 includes one or more processors 610, one or more memories 620 coupled to the processor 610, and one or more communication modules 640 coupled to the processor 610.

The communication module 640 is for bidirectional communications. The communication module 640 has one or more communication interfaces to facilitate communication with one or more other modules or devices. The communication interfaces may represent any interface that is necessary for communication with other network elements. In some example embodiments, the communication module 640 may include at least one antenna.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The instructions of the program 630 may include instructions for performing operations/acts of some example embodiments of the present disclosure. The program 630 may be stored in the memory, e.g., the ROM 624. The processor 610 may perform any suitable actions and processing by loading the program 630 into the RAM 622.

The example embodiments of the present disclosure may be implemented by means of the program 630 so that the device 600 may perform any process of the disclosure as discussed with reference to FIG. 2 to FIG. 5. The example embodiments of the present disclosure may also be implemented by hardware or by a combination of software and hardware.

In some example embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 7:
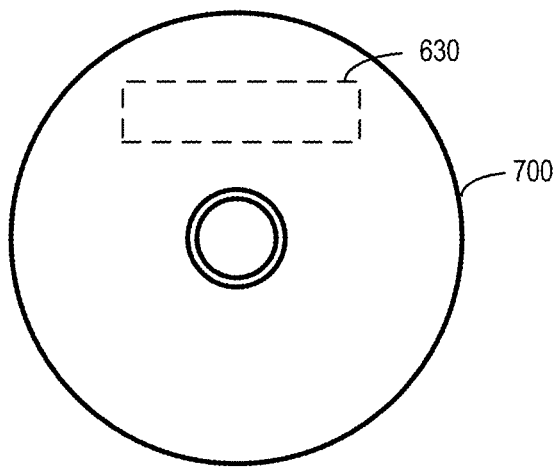
FIG. 7 illustrates a block diagram of an example computer readable medium in accordance with some example embodiments of the present disclosure.

FIG. 7 shows an example of the computer readable medium 700 which may be in form of CD, DVD or other optical storage disk. The computer readable medium 700 has the program 630 stored thereon.

Generally, various embodiments of the present disclosure may be implemented in hardware or special purpose circuits, software, logic or any combination thereof. Some aspects may be implemented in hardware, and other aspects may be implemented in firmware or software which may be executed by a controller, microprocessor or other computing device. Although various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first apparatus comprising:
    at least one processor; and
    at least one memory comprising instructions stored thereon that, when executed by the at least one processor, cause the first apparatus to perform at least:
        receiving, from a second apparatus, first downlink control information in a predefined downlink control information format, wherein the first downlink control information comprises a first indication regarding whether a cell off for entering a network energy saving mode is activated; and
        receiving, from the second apparatus, second downlink control information in the predefined downlink control information format, wherein the second downlink control information comprises a second indication regarding whether a cell discontinuous operation is activated, the cell discontinuous operation comprises at least one of: a cell discontinuous transmission or a cell discontinuous reception,
    wherein the first downlink control information and the second downlink control information are comprised in the same downlink control information message of the predefined downlink control information format, and
    wherein the downlink control information message has a bit block for each serving cell of the first apparatus, wherein a bit block for a primary cell has different bit fields in the predefined downlink control information format are used for the first indication and for the second indication.

2. The first apparatus of claim 1, wherein the instructions stored in the at least one memory, when executed by the at least one processor, further cause the first apparatus to perform:
    receiving, from the second apparatus, at least one higher layer configuration indicating at least one starting bit position for monitoring the first indication.

3. The first apparatus of claim 1, wherein the first apparatus comprises a terminal device, and the second apparatus comprises a network device.

4. The first apparatus of claim 1, wherein the instructions stored in the at least one memory, when executed by the at least one processor, further cause the first apparatus to perform:
    receiving, from the second apparatus, a configuration on which bit blocks are configured with the first indication and second indication.

5. The first apparatus of claim 1, wherein a bit block for a secondary cell in the downlink control information format has the second indication but not the first indication.

6. The first apparatus of claim 1, wherein the first apparatus is caused to perform a conditional handover based on the first indication.

7. The first apparatus of claim 6, wherein the first apparatus is caused to use a lower threshold for the conditional handover that is based on the first indication than for another handover.

8. The first apparatus of claim 1, wherein the predefined downlink control information (DCI) format is DCI format 2_9.

9. A second apparatus comprising:
    at least one processor; and
    at least one memory comprising instructions stored thereon that, when executed by the at least one processor, cause the second apparatus to perform at least:
        transmitting, to a first apparatus, first downlink control information in a predefined downlink control information format, wherein the first downlink control information comprises a first indication regarding whether a cell off for entering a network energy saving mode is activated; and
        transmitting, to the first apparatus, second downlink control information in the predefined downlink control information format, wherein the second downlink control information comprises a second indication regarding whether a cell discontinuous operation is activated, the cell discontinuous operation comprises at least one of: a cell discontinuous transmission or a cell discontinuous reception,
    wherein the first downlink control information and the second downlink control information are comprised in the same downlink control information message of the predefined downlink control information format, and wherein the downlink control information message has a bit block for each serving cell of the first apparatus, wherein a bit block for a primary cell has different bit fields in the predefined downlink control information format are used for the first indication and for the second indication.

10. The second apparatus of claim 9, wherein the instructions stored in the at least one memory, when executed by the at least one processor, further cause the second apparatus to perform:
transmitting at least one higher layer configuration indicating at least one starting bit position for monitoring the first indication.

11. The second apparatus of claim 9, wherein the first apparatus comprises a terminal device, and the second apparatus comprises a network device.

12. The second apparatus of claim 9, wherein the second apparatus is caused to transmit a configuration on which bit blocks are configured with the first indication and second indication.

13. The second apparatus of claim 9, wherein a bit block for a secondary cell in the downlink control information format has the second indication but not the first indication.

14. The second apparatus of claim 9, wherein the predefined downlink control information (DCI) format is DCI format 2_9.

15. A method comprising:
receiving, at a first apparatus, from a second apparatus, first downlink control information in a predefined downlink control information format, wherein the first downlink control information comprises a first indication regarding whether a cell off for entering a network energy saving mode is activated; and
receiving, from the second apparatus, second downlink control information in the predefined downlink control information format, wherein the second downlink control information comprises a second indication regarding whether a cell discontinuous operation is activated, the cell discontinuous operation comprises at least one of: a cell discontinuous transmission or a cell discontinuous reception,
wherein the first downlink control information and the second downlink control information are comprised in the same downlink control information message of the predefined downlink control information format, and
wherein the downlink control information message has a bit block for each serving cell of the first apparatus, wherein a bit block for a primary cell has different bit fields in the predefined downlink control information format for the first indication and for the second indication.

16. The method of claim 15, wherein the first apparatus receives, from the second apparatus, a configuration on which bit blocks are configured with the first indication and second indication.

17. The method of claim 15, wherein a bit block for a secondary cell in the downlink control information format has the second indication but not the first indication.

18. The method of claim 15, wherein the first apparatus performs a conditional handover based on the first indication.

19. The method of claim 18, wherein the first apparatus uses a lower threshold for the conditional handover that is based on the first indication than for another handover.

20. The method of claim 15, wherein the predefined downlink control information (DCI) format is DCI format 2_9.

* * * * *